May 24, 1932.  E. A. ROCKWELL  1,859,530
VEHICLE BRAKE
Filed Dec. 12, 1927   7 Sheets-Sheet 1

Inventor
Edward A. Rockwell.
By his Attorneys
Burton Burton

May 24, 1932.   E. A. ROCKWELL   1,859,530
VEHICLE BRAKE
Filed Dec. 12, 1927   7 Sheets-Sheet 5

May 24, 1932. E. A. ROCKWELL 1,859,530
VEHICLE BRAKE
Filed Dec. 12, 1927 7 Sheets-Sheet 6
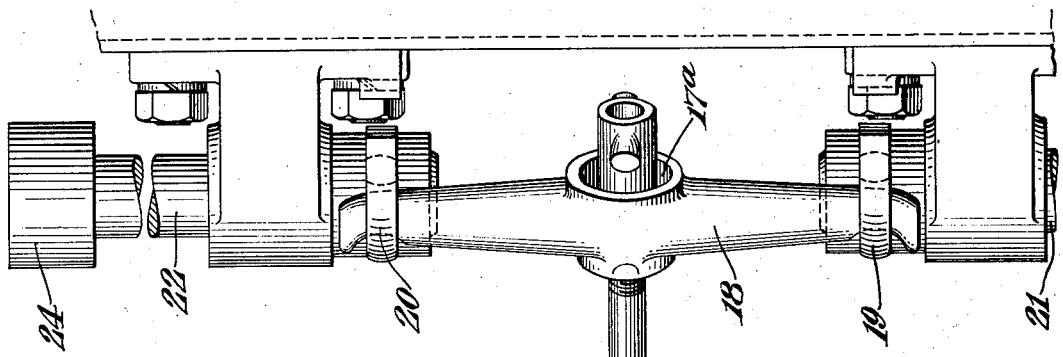
Fig. 6.
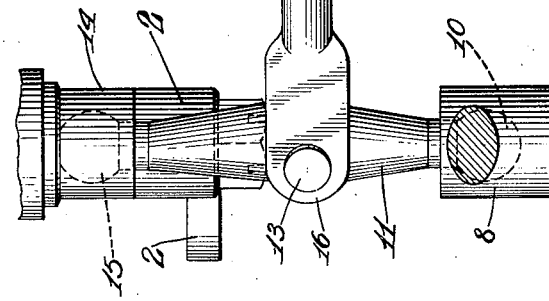
Inventor
Edward A. Rockwell.
By his Attorneys.
Burton & Burton May 24, 1932.  E. A. ROCKWELL  1,859,530
VEHICLE BRAKE
Filed Dec. 12, 1927   7 Sheets-Sheet 7

Witness
N. O. McKnight.

Inventor
Edward A. Rockwell
by Burton & Burton
his Attorneys.

Patented May 24, 1932

1,859,530

UNITED STATES PATENT OFFICE

EDWARD A. ROCKWELL, OF LONG ISLAND CITY, NEW YORK

VEHICLE BRAKE

Application filed December 12, 1927. Serial No. 239,304.

My invention relates particularly to a brake construction adapted for the controlling of speeds, but has application especially to brakes used in controlling the speeds of vehicles such as automobiles.

The subject matter of the present application is an improvement on the construction shown and described in my application upon brake for motor driven vehicle, filed October 8, 1927, Serial No. 224,846.

The specific purposes of the improvements over the construction covered by said application are:

First, to provide a braking mechanism comprising braking means operated at will connected for bringing into operation a servo braking means to a degree corresponding to the extent of the operation of the means operated at will, with connections from the servo-operated elements reacting on the mechanism operated at will for giving the latter mechanism additional action on the servo mechanism, and thus building up the servo-braking action from a limited action of the parts operated at will.

Second, by thus automatically building up the servo-braking action on the mechanism which is operated in the travel of the vehicle, to obtain adequate braking without necessarily employing four-wheel brakes.

Third, to distribute the reaction from the servo-braking mechanism in part to the at-will-operated means, and in part to the front wheel braking means, thereby building up the servo-braking effect more slowly, but upon a larger and more distributed braking area; and also to equalize the braking action on the two front wheels throughout the range of automatic building up of that action.

Fourth, to obtain the automatic building up of the servo-braking action in the braking mechanism adapted to operate for braking in rearward running of the vehicle, as well as in forward running.

Fifth, to obtain by the same means the automatic building up of the servo-braking effect and the automatic building up of the direct braking effect.

A further advantage is due to a construction in which I utilize the same braking element for the servo control and effecting a primary braking action as well as amplifying means both as to foot pressure and travel, this either being secured as braking effect, only on the rear wheels, or on all four wheels, as desired. A further advantage with this construction is that either forward or rearward braking is secured on the servo and at the same time all the available brake surface is utilized in the same brake element, this being an improvement over the three shoe type of servos in which one of the shoes is a brake for the reverse direction of rotation.

While my invention is capable of embodiment in many different forms, for the purpose of illustration I have shown only certain forms of the invention in the accompanying drawings, in which Figure 1 shows diagrammatically a chassis equipped with the form of my invention illustrated in Figures 4 to 8, inclusive.

Figure 6 is a plan view showing an enlarged detail drawing of the front wheel brake actuating linkage and equalizer.

Figure 1:
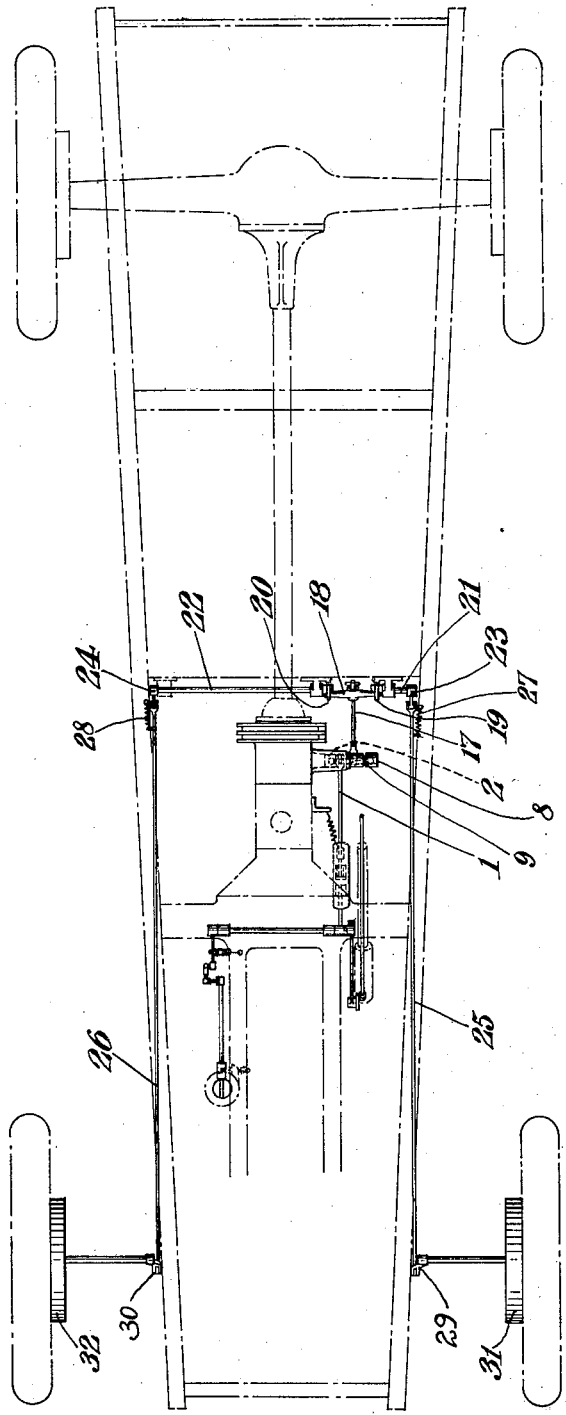
Figure 8:
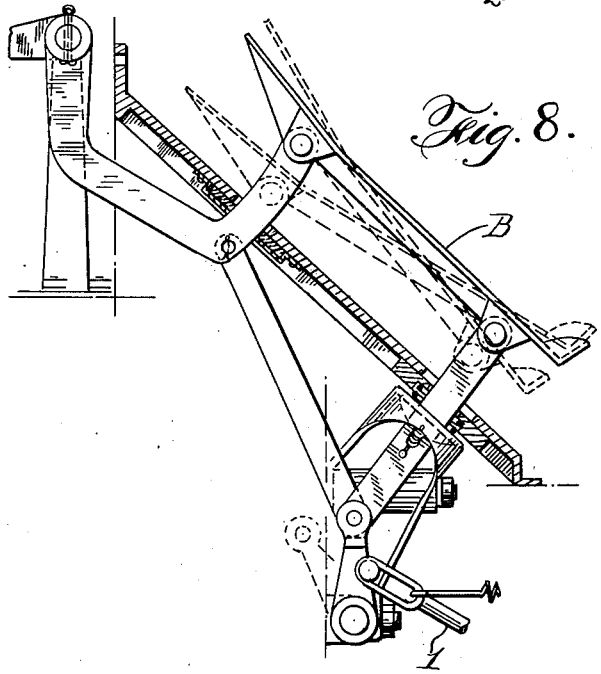
Figure 8 is a detail elevation of the pedal and its brake-operating connections.

In the drawings I have shown a pedal operated link, 1, which is adapted to be operated by the pedal operating mechanism exactly as shown in my application upon brakes, above referred to, and partly shown in Figure 1. It will be understood that in the initial action to bring the parts into operation for braking, the pedal has been operated by depressing the heel from which the toggle link and lever connections shown are adapted to permit a limited and quite short downward stroke from the full line to the dotted line position as seen in Figure 8, for giving a limited forward pull to the link, 1, of Figure 5, which operates the brake mechanism; and it will be noted that the connection of said link, 1, at the forward end to the pedal-actuated connection provides for a range of forward thrust of the link in excess of that which it may derive from the depression of the pedal, the provision consisting in elongation of the slot, 1ª, for the pivotal connection at the forward end of the link. The purpose served by this provision of greater range of movement of the link than utilized in the pedal stroke will hereinafter be made to appear.

Figure 7:
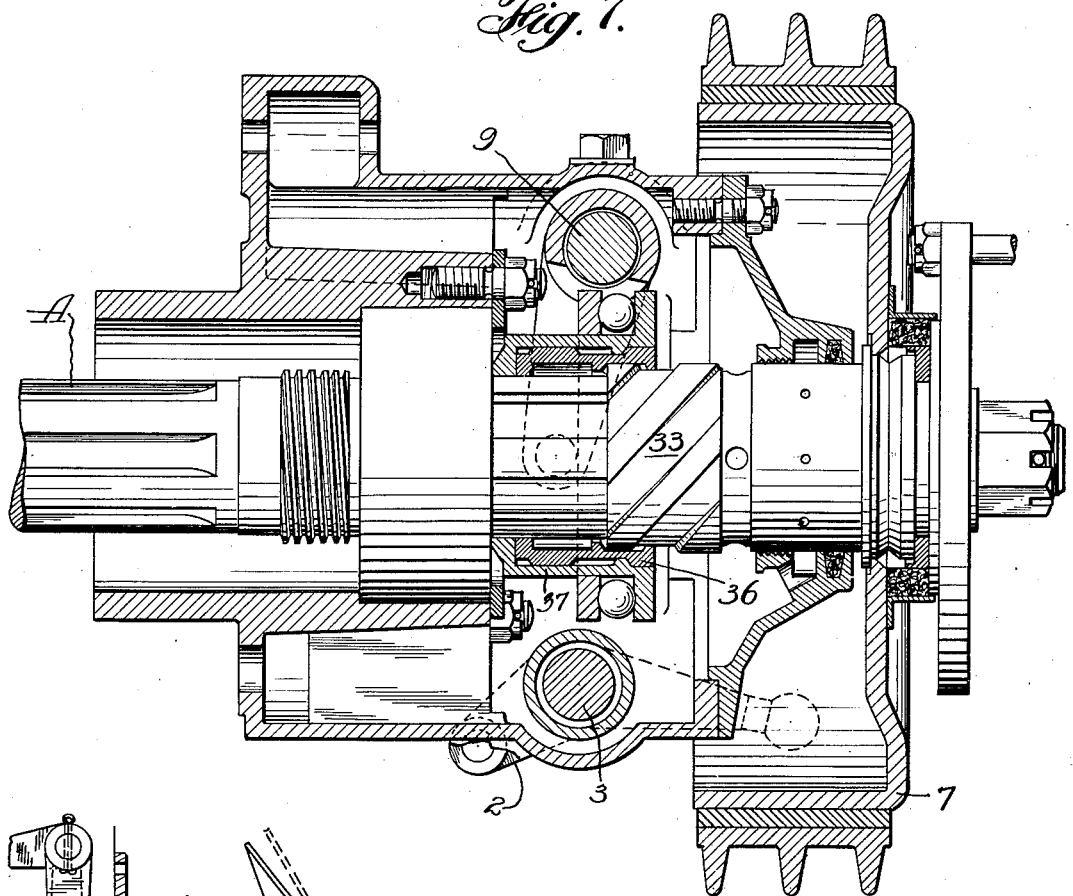
Figure 7 is a vertical longitudinal section of the construction of Figure 5 showing the interior construction of the servo brake device.

The servo or power brake 4 illustrated in detail in Figure 7 is described more fully and claimed in my co-pending application previously referred to, Serial No. 224,846, but it will be understood that the construction comprises a brake drum 7 mounted on the propeller shaft A immediately in rear of a housing located adjacent the transmission housing of the vehicle. The brake drum is normally rotated at the speed of the drive shaft A through interengaging oppositely spiral surfaces formed on concentrically disposed sleeves 33, 36, and 37. The inner sleeve 33 is rigid with the brake drum 7. The intermediate sleeve 36 has interior and exterior oppositely disposed spirals. The outer sleeve 37 is keyed to the shaft A for rotation therewith and may move axially with respect thereto. The brake drum itself is held against axial movement but the displaceable spiral sleeves 36 and 37 are normally held in inoperative position by the resistance to movement of the brake linkage. It will be apparent that a retardation applied to the brake drum in either direction of its rotation will cause an axial displacement of the outer spiral sleeve 37 thereby moving a yoke arm which turns the output rock shaft 9. The retardation may be applied to the drum 7 by any of the usual forms of frictional retarding mechanism and I have shown a pair of brake shoes 5 and 6 mounted on fixed anchor points to be contracted around the exterior of the brake drum 7 by suitable actuating elements through the movement of the input rock shaft 3. Operation of the power brake by retardation applied to the drum will cause the drum to be retarded relative to the speed of the power shaft A until the resistance to further movement of the output rock shaft becomes such as to prevent further retardation of the brake drum and it will be again driven at the speed of the power shaft while the frictional retarding means acts directly to retard the travel of the vehicle through the rear wheels. The input rock shaft 3 has secured thereto a lever 2 adapted to be connected to the linkage 1 while the output rock shaft 9 has secured thereto a lever 8. According to my previous invention the output lever serves to directly pull on the wheel brakes while, according to the present invention, a portion or all of the movement of the output lever is utilized to further move the input lever thereby increasing the braking done by the power brake 4 and further increasing the output therefrom.

In the present invention, the lever, 8, has a ball socket joint, 10, adapted to receive in it the ball terminal of a lever, 11, which has a sliding fit in the socket, 10. The lever, 11, is fulcrumed on a short shaft, 13, the other end of the lever having a ball terminal, 15, for connecting the lever to a lever arm, 14, of the lever, 2, at the ball joint socket, 14ª, in said lever arm, in which the lever is retained by a spring, 12, at the opposite end of said lever, 11, in the socket for the ball terminal, 10, thereof. The lever, 11, serves the purpose of distributing the force derived through the servo device from the running of the vehicle mechanism in part to the shaft, 3, for rocking it, by the connection with the lever arm, 14, as described, in the direction for tightening the brake shoes on the drum of the servo device, to increase the servo action and in part to the front wheel brakes, this distribution to the front wheel brakes being accomplished by mounting the pivot of the shaft, 13, on a fork terminal, 16, of a link, 17, the other end of which at 17ª is connected to an equalizing lever, 18, for equalizing the pressure on the two front wheel brakes. At the connection at 17ª, provision is desirably made for some lost motion, so that the distribution described may be adequately effective at the servo device before the movement is stopped by the setting of the brake shoes on the wheels. The lever, 18, is connected at its two ends to arms, 19 and 20, respectively, on the proximate ends of shafts, 21 and 22, which at their opposite ends have lever arms, 23 and 24, respectively, connected by adjustable links, 25 and 26, to lever arms, 29 and 30, respectively, for actuating the front wheel brakes, 31 and 32, pull-back springs, 27 and 28, being stretched from connections on the levers, 25 and 26, respectively, to the points of attachment of the opposite ends of the spring on the chassis side bars.

It will be understood that although as shown, the fulcrum of the lever, 11, is at its middle point, making the two arms equal, this equality making the distribution described equal to the wheel brake and to the servo, is only preferential, and the lever, 11, may be fulcrumed at any point in its length according to the distribution considered most desirable.

Figure 2:
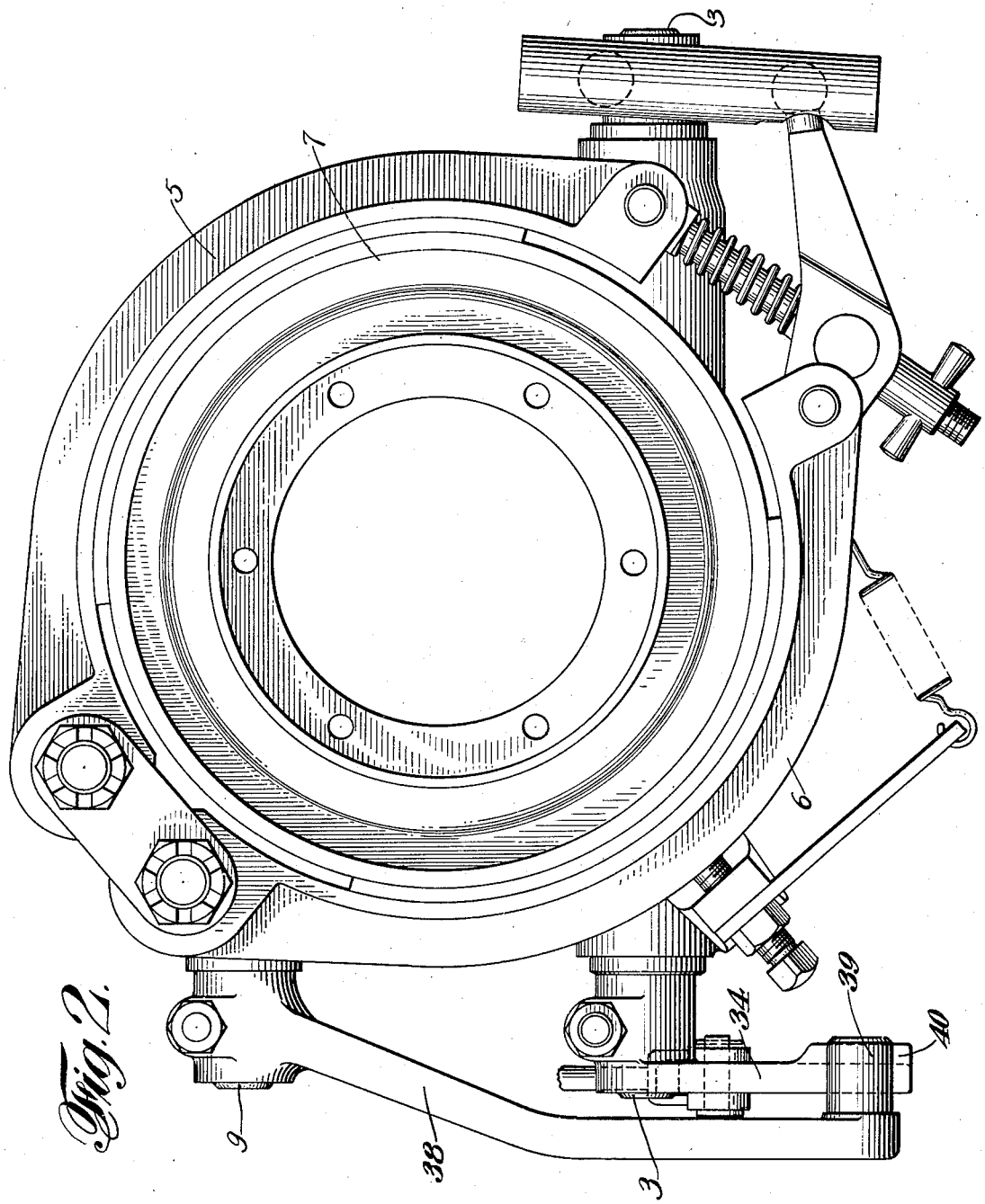
Figure 2 is a rear elevation of a modified construction of the linkage for operating the servo brake.
Figure 3:
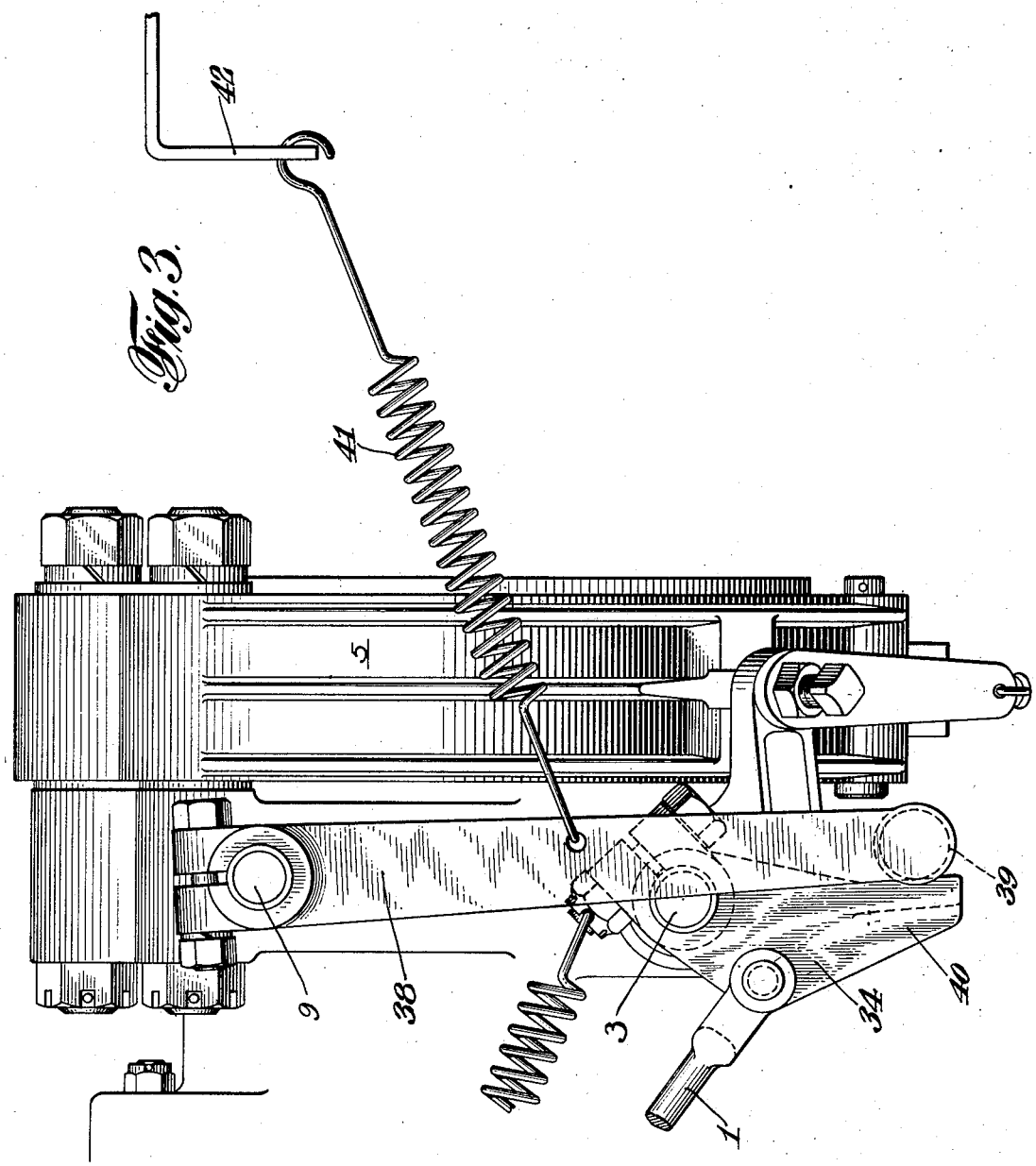
Figure 3 is a side elevation of the construction shown in Figure 2.

In Figures 2 and 3 I have shown a modified construction. In this modification the lever arm, 34, of the rock shaft, 3, and the arm, 38, of the rock shaft, 9, corresponding in part to the lever arms, 2 and 8 respectively, of the form first described, are modified to perform the function of reacting through the servo on the primary pressure supplying means as will now be described. The lever arm, 34, has an extension, 40, downward from the pivot of the operating rod, 1, and the lever arm, 38, is extended past the shaft, 3, and the pivot of the rod, 1, to the arm, 34, and provided with a laterally offset stud, 39, which in certain positions of the parts operates against the extension, 34, of the shaft, 3. The operation of the input rock shaft 3 from the output lever of the power brake is similar to the action described with reference to Figures 4 and 5 in which the cross link 11 between the input and output levers transmits a portion of the movement of the output lever to further turn the input rock shaft 3. It will be noted that this arrangement provides a lost motion connection between the extension, 39, and the lever, 34, as hereinafter referred to. The lever, 38, has attached thereto a pull-back spring, 41, the other end of which is connected to a bracket, 42, supported in any desired manner from the chassis.

Figure 4:
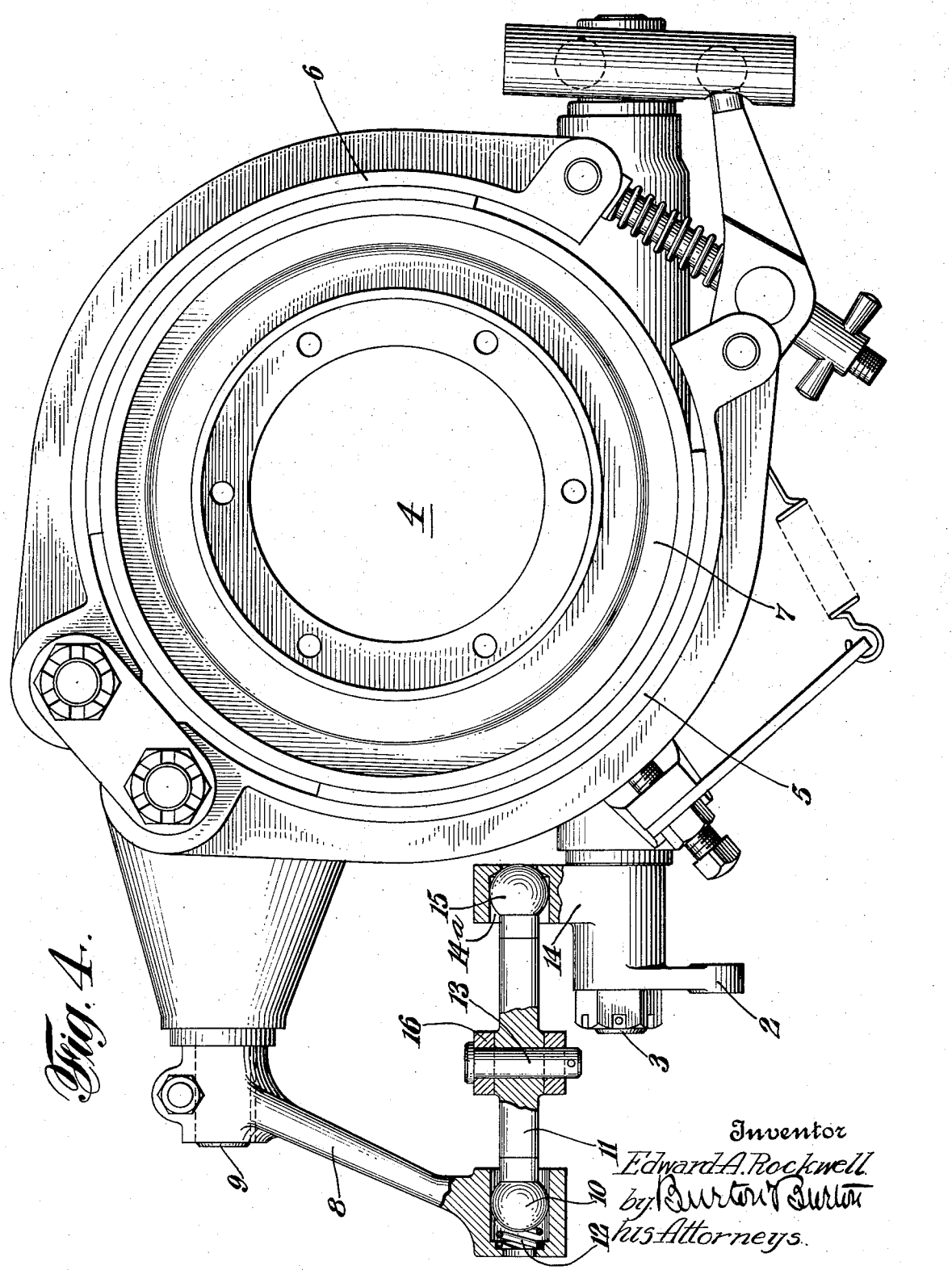
Figure 4 is a rear side elevation of the form of the servo brake linkage illustrated in Figure 1.
Figure 5:
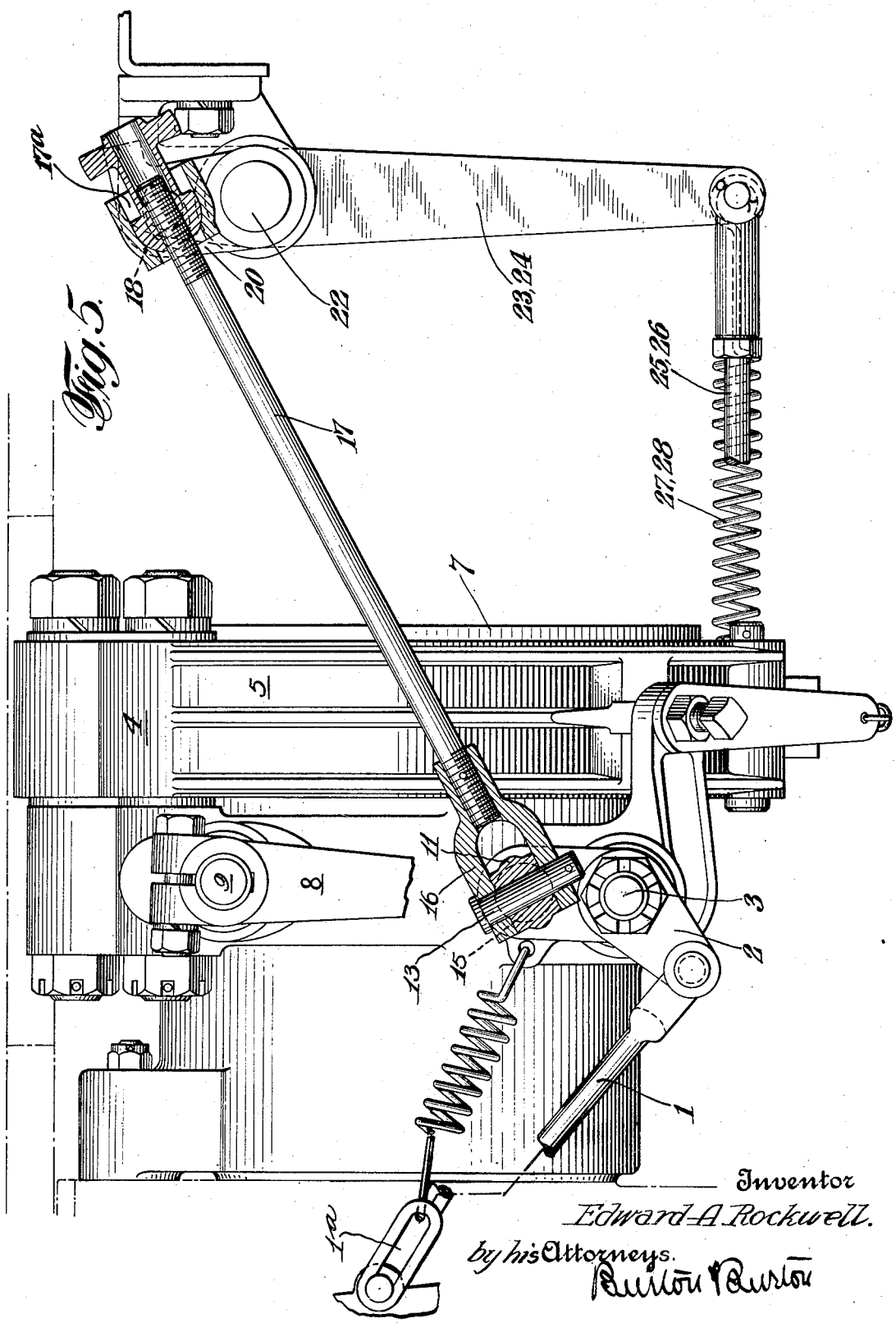
Figure 5 is a side elevation of the same.

In the operation of the form of my invention shown in Figures 4, 5 and 6, which is the preferred form of my invention in this application, it will be understood that the brake as shown in said figures as illustrated in the forward braking position. This position will have been brought about by the depression of the pedal and the consequent forward movement of the link 1. This results in bringing the servo brake, 4, into operation by slowing up the drum, 7, therein, and the consequent actuation of the spiral elements 33 and 36, so as to put an initial braking effect upon the car by means of the drum, 7, and also to move the lever, 8. As a result the lever 8, in the first part of its movement causes the lost motion connection, 17ª, which has been initially moved away from its seat therein by the initial movement of the lever, 2, to become seated, and the further movement of the lever, 8, results in pressure being applied by the servo brake, not only upon the front wheel brakes 31 and 32, but also upon the drum, 7, through the reaction of the lever, 11, at the end, 15, on the lever arm, 14, actuating the lever, 2, in the same direction as it is actuated by the pedal-operated link, 1, in the initial braking action of the pedal, the braking force being equalized among these various brakes by reason of the levers, 11 and 18, in the manner described. This forward movement of the link, 1, is made possible without disturbing the pedal by the lost motion provision consisting of the elongated slot, 1ª.

The form of my invention shown in Figures 2 and 3 operates in much the same way. In this form, however, there are no front wheel brakes and the addition braking effect is obtained entirely by the reaction of the servo brake on the initial brake-applying means operated at will for bringing the servo brake into action by the power braking pressure being applied to the drum in said servo brake device, thus building up the braking action of the servo braking device. This is brought about as follows: The first forward movement of the rod operates the brake shoes, 5 and 6, to slow down the drum and to apply a certain amount of braking force thereto, this being accompanied by the movement of the end of the lever 40, away from the extension, 39. The actuation of the brake in this manner, however, causes the lever, 38, to move, which then contacts with the end of the lever, 40, rocking the shaft, 3, further in the same direction as it was initially rocked by the rod, 1, for tightening the brake shoes on the drum of the servo brake, and thus as in the form shown in Figures 4, 5 and 6, building up the servo-braking automatically from the relatively limited to the maximum efficiency of which it is capable.

I claim:

1. In combination, a pressure-applying mechanism operable at will, a power brake comprising a normally rotatable but retardable brake element, said pressure-applying mechanism being operable to retard the rotation of the normally rotatable brake element, a power transmitting output connection adapted to be moved by the retardation of said brake element for moving the first mentioned pressure applying mechanism further in the direction of the initial operation at will, to increase the braking effect upon the power brake and secondary braking means brought into action by the operation of said power brake.

2. In combination, a pressure applying mechanism operable at will; a servo brake comprising spiral actuating elements brought into action by said pressure applying mechanism, and means adapted to be moved by the servo brake for moving said pressure applying mechanism further in the direction of the initial operation thereof at will to increase the braking effect upon the servo brake.

3. In a wheeled vehicle having wheel brakes, in combination, pressure applying mechanism operable at will; a servo brake brought into action by the action of said pressure applying mechanism, and means adapted to be moved by the servo brake for moving said pressure applying mechanism further in the direction of the initial operation thereof at will, and operating connections from said servo brake to the wheel brakes.

4. In a wheeled vehicle having wheel brakes, pressure applying mechanism operable at will; a servo brake mechanism comprising spiral brake actuating elements, and connections from said pressure applying mechanism for bringing said spiral elements into action, and connections from the servo brake for operating the pressure applying mechanism operable at will, further in the direction of the initial operation of the same at will, to increase the braking effect upon the servo brake, and connections from the servo brake for bringing into action the wheel brakes.

5. In a vehicle having front wheel brakes, in combination, pressure applying mechanism operable at will; a servo brake brought into action by said pressure applying mechanism, and connections by which the servo brake reacts upon said pressure applying mechanism operable-at-will, for moving the same further in the direction of the initial operation thereof at will, to increase the braking effect upon the servo brake, and connections from said servo brake for bringing into action the front wheel brakes.

6. In a vehicle having front wheel brakes, in combination, pressure applying mechanism operable at will, servo brake mechanism comprising spiral brake actuating elements connected for being brought into action by said pressure applying mechanism, and connections from the servo brake mechanism for reacting on said pressure applying mechanism operable-at-will, for moving the same further in the direction of the initial movement at will to increase the braking effect upon the servo brake, and connections from the servo brake for bringing into action the front wheel brakes.

7. In a wheeled vehicle having wheel brakes, pressure applying mechanism operable at will; a servo brake connected for being brought into action by said pressure applying mechanism, and means connected for movement by the servo brake for reacting on the pressure applying mechanism operable at will for further movement of the same in the direction of the initial operation at will, to increase the braking effect upon the servo brake, connections from the servo brake for bringing into action the wheel brakes, and means in said connections for distributing in predetermined proportions the force applied by the pressure applying mechanism operable-at-will, between the servo brake and the wheel brakes respectively.

8. In a wheeled vehicle having wheel brakes, in combination, pressure applying mechanism operable at will, a servo brake mechanism comprising spiral brake actuating elements brought into action by the application of said pressure applying mechanism, means connected for being moved by the servo brake for reacting upon said pressure applying mechanism for movement thereof further in the direction of the initial movement at will to increase the braking effect on the servo brake, connections from the servo brake for bringing into action the wheel brakes, and means in said connections for equalizing and distributing in predetermined proportions the force applied by the pressure applying mechanism operated-at-will, between the servo brake and the wheel brakes.

9. In a wheeled vehicle having wheel brakes, in combination, a pressure applying mechanism operable at will, a servo brake mechanism connected for being brought into action by the pressure applied mechanism operated at will, means connected for movement by the servo brake mechanism for reacting upon the pressure applying mechanism operable-at-will, for movement thereof further in the direction of the initial movement at will, to increase the braking effect upon the servo brake, connections from the servo brake mechanism for bringing into action the wheel brakes, means in said connections for distributing the force applied by said pressure applying mechanism operated-at-will, between the servo brake and the wheel brakes, and means for equalizing the pressure applied to the respective brakes of the two wheels of a pair.

10. In a wheeled vehicle having wheel brakes, in combination, pressure applying mechanism operable at will, a servo braking mechanism comprising spiral brake actuating elements connected for being brought into action by said pressure applying mechanism operable at will, means connected for being moved by the servo brake mechanism for reacting upon the pressure applying mechanism operable-at-will, for movement thereof further in the direction of the initial movement at will to increase the braking effect thereof upon the servo brake, connections from the servo brake for bringing into action the wheel brakes, means in said connections for distributing the force applied by the pressure applying mechanism operable at will between the servo brakes and the wheel brakes, and means for equalizing the pressure applied to the two wheel brakes of a pair.

11. In a wheel vehicle having wheel brakes, in combination, pressure applying mechanism, a servo brake mechanism connected for being brought into action by the pressure applying mechanism operable-at-will, means adapted to be moved by connections from the servo brake mechanism for reacting upon the pressure applying mechanism operable at will for movement thereof further in the direction of the initial movement at will, to increase the braking effect upon the servo brake, and connections from the servo brake for bringing into action the wheel brakes, said last mentioned connections comprising a lost motion connection between the servo brake mechanism and the wheel brakes.

12. In a wheel vehicle having wheel brakes, in combination, pressure applying mechanism operable at will, a servo brake mechanism comprising spiral brake actuating elements brought into action by connection with the pressure applying mechanism operable at will, means connected for movement by the servo brake mechanism for reacting on the pressure applying mechanism operable at will, for movement of the latter further in the direction of its initial movement at will, to increase the braking effect upon the servo brake, and connections from the servo brake for bringing into action the wheel brakes containing a lost motion connection between the servo brake mechanism and the wheel brakes.

13. In combination, a pressure applying mechanism operable at will, a servo brake mechanism connected for being brought into action by said pressure applying mechanism; means adapted to be moved by the servo brake mechanism for reacting upon said pressure applying mechanism for movement of the latter further in the direction of the initial movement thereof at will, to increase the braking effect of said pressure applying mechanism upon the servo brake, said connections for reaction upon the pressure applying mechanism comprising a lost motion connection for permitting the operation of the pressure applying mechanism at will independently of the reaction thereon of the servo brake mechanism for said increased movement.

14. In combination, a pressure-applying mechanism operable at will, a power brake mechanism comprising a driven member, a brake element normally rotatable with the driven member but capable of limited rotation with respect thereto, said brake element being stopped against axial movement, said pressure-applying mechanism being operable to frictionally retard the rotation of said brake element and having a range of movement less than that required for completely operating the power brake mechanism and a power transmitting connection moved by the relative rotation between said brake element and said driven member for effecting the additional movement of the pressure-applying mechanism for completely applying the brake.

15. In combination with a vehicle having wheel brakes, power brake mechanism operable through the movement of the vehicle for applying the wheel brakes, manually operable mechanism for bringing said power brake mechanism into operation independent of initial application of the wheel brakes and means adapted to be moved by the operation of said power brake mechanism for further applying said power brake mechanism to develop an increased output for applying the wheel brakes independent of the manually operable mechanism.

16. In combination with a vehicle having wheel brakes, power brake mechanism operable through the movement of the vehicle, output connections from the power brake mechanism to the wheel brakes, input connections for applying said power brake mechanism without initial application of the wheel brakes, manually operable means for moving said input connections to bring said power brake mechanism into operation and means for increasing the output of said power brake mechanism by utilizing a portion thereof for further applying said power brake mechanism after it has been once brought into action by the actuation of the manually operable means.

17. In combination with a vehicle having wheel brakes, power brake mechanism operable in part by the movement of the vehicle, input means for applying said power brake mechanism, output means moved by the operation of said power brake mechanism, connections from said output means for applying the wheel brakes by the operation of said power brake mechanism, manually operable means for moving said input means to bring said power brake mechanism into action without initial application of the wheel brakes and means for increasing the effectiveness of the power brake mechanism independent of the pressure applied to the manually operable means by using a portion of the movement of the output means for further moving the input means in a direction to further apply said power brake mechanism.

18. In combination with a vehicle, wheel brakes therefor, linkage for applying said wheel brakes, a power brake associated with the propeller shaft of the vehicle, input and output levers associated with said power brake, manually operable means for moving said input lever to apply said power brake and means pivotally connected to said input and output levers and to said brake applying linkage whereby the input lever may be initially moved to apply the power brake without movement of the output lever and movement of the output lever will, in part, apply the wheel brakes and, in part, further move the input lever.

19. In combination with a vehicle, wheel brakes therefor, linkage for applying said wheel brakes, a power brake associated with the propeller shaft of the vehicle, input and output levers associated with said power brake, manually operable means having a lost motion connection for moving said lever for applying said power brake, means pivotally connected to said input and output levers, a lost motion connection between said last mentioned means and the brake applying linkage whereby the input lever may be initially moved to apply the power brake without movement of the output lever and without movement of the wheel brake linkage.

20. Power brake mechanism comprising a drive shaft, a brake element yieldably driven from said shaft for normal rotation therewith but capable of limited relative rotation with respect thereto, pressure applying mechanism operable to retard the rotation of said brake element and means operative by the relative rotation between said brake element and said shaft for producing additional retarding pressure upon said brake element.

21. Power brake mechanism comprising a drive shaft, a brake drum yieldably driven from said shaft for normal rotation therewith but capable of limited relative rotation with respect thereto, a pair of brake shoes having fixed anchor points, means for moving said brake shoes into engagement with said brake drum to produce retardation thereof and relative rotation with respect to said drive shaft and means moved by the relative rotation between said brake drum and said shaft for producing additional pressure tending to move said brake shoes into frictional engagement with said drum.

22. In combination with a vehicle, power braking mechanism associated with the propeller shaft of the vehicle, an input rock shaft to the power brake mechanism, an input arm carried by said input rock shaft, a pedal controlled link for moving said arm and said input rock shaft for bringing said power brake into action, and output rock shaft from said power brake mechanism, an output lever carried by said output rock shaft arranged to be moved by the operation of said power mechanism into thrust engagement with said input arm to produce additional input pressure thereon.

23. In combination with a vehicle, power braking mechanism associated with the propeller shaft of the vehicle, an input rock shaft to the power brake mechanism, an input arm carried by said input rock shaft, a pedal controlled link for moving said arm and said input rock shaft for bringing said power brake into action, an output rock shaft from said power brake mechanism, an output lever carried by said output rock shaft arranged to be moved by the operation of said power mechanism into thrust engagement with said input arm to produce additional input pressure thereon and resilient means connected between a stationary part of the vehicle and said output lever for normally holding said output lever in inoperative position.

24. In combination with a vehicle, power braking mechanism having input and output rock shafts, a pair of lever arms each of which is secured to one of said rock shafts, a link pivotally connected at each end to one of said lever arms and a tension transmitting pull rod pivotally secured at an intermediate point to said link forming a fulcrum for said link, whereby operative movement of said output rock shaft turns said link in a direction to produce operative movement upon said input rock shaft.

In testimony whereof, I have hereunto set my hand at Chicago, Illinois, this 3d day of December, 1927.

EDWARD A. ROCKWELL.